United States Patent Office 2,735,836
Patented Feb. 21, 1956

2,735,836

UNSATURATED ORGANIC COMPOUND-SULFUR DIOXIDE RESINS STABILIZED WITH THIOPHOSPHORIC ACIDS AND THEIR DERIVATIVES

Robert J. Fanning, Borger, Tex., assignor to Phillips Petroleum Company, a corporation of Delaware No Drawing. Application January 19, 1953,
Serial No. 332,106

18 Claims. (Cl. 260—45.75)

This invention relates to the stabilization against decomposition during extrusion molding as well as at elevated temperatures of resins prepared from an unsaturated organic compound and sulfur dioxide by reaction of said compound and said sulfur dioxide under conditions which cause heteropolymerization. In one of its aspects, the invention relates to the preparation of a stable resin, as described, by incorporation therein of a stabilizer compound. In another aspect, the invention relates to the preparation of a stable resin by incorporation therein of a compound novel for this purpose. In still another aspect, the invention relates to the provision of a stabilizer for resins, as described. In a further aspect, this invention relates to the stabilization of a resin consisting essentially of the heteropolymer of an unsaturated organic compound and sulfur dioxide, and to the stable resin thus produced, by incorporating into the resin, during its preparation or thereafter, certain thiophosphoric acids and derivatives of thiophosphoric acids.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as addition compounds for the olefin-sulfur dioxide resins. These addition compounds include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially an unstable as in their absence. More recently it has been disclosed that sulfhydryl compounds such as mercapto ethanol, thio glycollic acid, benzyl mercaptan and the like impart thermal stability to said resins. However, these compounds are malodorous and are undesirable in commercial products. In addition those compounds are often not readily available.

I have now discovered that the incorporation of thiophosphoric acid and derivatives of thiophosphoric acids having the formulas indicated below provide a marked improvement in the thermal stability of olefin-SO₂ resins and render them highly resistant to thermal decomposition. These stabilizing agents have the following structural formulas:

(1)

wherein X is selected from the group consisting of oxygen and sulfur, at least one and not more than three X's being sulfur; wherein R is selected from the group consisting of an alkyl group containing from 1 to 16 carbon atoms such as methyl, ethyl, tertiary butyl, secondary hexyl, normal octyl, tertiary octyl, tertiary dodecyl, secondary tridecyl, tertiary hexadecyl, and the like; an aryl and substituted aryl group containing from 6 to 16 carbon atoms such as phenyl, tolyl, ethylphenyl, tertiary butylphenyl, ditertiary butylphenyl, hexylphenyl, secondary octylphenyl, naphthyl, methylnaphthyl, tertiary butyl naphthyl, and the like; and a cycloalkyl or substituted cycloalkyl containing not more than 16 carbon atoms and preferably containing 5-6 carbon atoms in the cycloalkyl ring such as cyclopentyl, cyclohexyl, methylcyclopentyl, ethylcyclopentyl, dimethylcyclopentyl, tertiary butylcyclopentyl, methylcyclohexyl, isopropylcyclohexyl, secondary butylcyclohexyl, normal heptylcyclohexyl, ethylpropylcyclohexyl and the like; and one but not more than one R can be hydrogen;

(2)

(3)
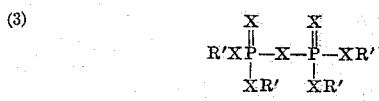

wherein X is selected from the group consisting of oxygen and sulfur with at least three X's being sulfur;

(4)
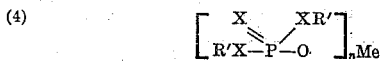

wherein X is selected from the group consisting of oxygen and sulfur with at least one X being sulfur;

(5)

wherein X is selected from the group consisting of oxygen and sulfur and (6)
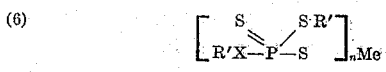

wherein X is selected from the group consisting of oxygen and sulfur and wherein in the above Formulas 2 to 6, R' is selected from the group consisting of alkyl and substituted alkyl, aryl and substituted aryl, a cycloalkyl and substituted cycloalkyl radical, examples of which are the same as those given for R above and wherein the R' radicals will not contain more than 16 carbon atoms each. Me is a metal from group I–A, such as Li, Na, K; II–A, such as Mg, Ca, Ba; II–B, such as Zn, Cd, Hg; IV–B, such as Pb and Sn as defined on page 118 of Mellor's Modern Inorganic Chemistry by Parkes and Mellor, Longmans, Green and Company (1939) and in Mendeleeff's Periodic Table; and $n$ is equal to the valence of Me.

A preferred group of stabilizing agents is that having the general formula

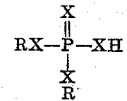

wherein the X's and R's are selected as Formula 1 defined above.

A more preferred group of stabilizing agents is that having the general formula

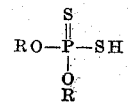

wherein the R's are selected from the group consisting of the hydrocarbon groups mentioned for Formula 1 above.

These stabilizers may also contain other substituent groups provided, of course, that they do not interfere with or detract from the stabilizing effect of the compounds. They are well-known chemical compounds and can be prepared by methods described in the literature. It is preferred that the stabilizer contain from 20 to 36 carbon atoms per molecule. The quantity of stabilizer employed is usually from 0.05 to 10, preferably 0.2 to 5 weight per cent, based on the weight of the dry resin.

The olefin-sulfur dioxide resins can be prepared by reacting sulfur dioxide with various unsaturated organic compounds, according to methods known in the art. Unsaturated organic compounds which can be employed are, for example, monoolefins and substituted monoolefins such as the normal butenes, pentenes, octenes, 4-cyclohexylbutene-1, and the like, cycloolefins such as cyclohexene, acetylenes, and polyfunctional unsaturated compounds such as allyl alcohol, vinyl acetate, allyl ethyl ether, ortho-allylanisole, ortho-allylphenol, para-bromoallylbenzene, methyl undecylenate, undecylenyl alcohol, undecylenic acid, acrylonitrile, etc. Mixtures of these olefins can also be employed to prepare the olefin-sulfur dioxide resins. The resins can be prepared by various methods, for example, by reacting sulfur dioxide with an olefin in the presence of an excess of the sulfur dioxide. The reaction can also be carried out in the presence of acetone or other solvent as a reaction medium. Another, and often preferred, method of preparing the resins is by the emulsion polymerization of the olefin and the SO₂ as described in copending application Serial 8,755, filed February 16, 1948, by Willie W. Crouch and Ernest W. Cotten, issued July 14, 1953, as Patent 2,645,631.

While the stabilizers can be incorporated in the resin in any suitable manner, it is important that they be thoroughly and intimately mixed with the resin to provide the maximum stabilizing effect. For example, the stabilizers can be thoroughly admixed with finely-divided, powdered resin. If desired, the stabilizers can be dissolved in a suitable solvent such as benzene, methylcyclohexane, paraffins such as heptane and higher boiling, and the like, and this solution admixed with the resin. When the resins are prepared by polymerization in aqueous emulsion, the stabilizers can be added directly to said emulsion prior to coagulation of the resins. Upon coagulation of this latex containing the stabilizer, a resin is obtained which contains said stabilizer in a very finely and uniformly dispersed form. In some instances it may be desirable to dissolve the stabilizer in a solvent such as benzene or other suitable solvent, prepare an aqueous emulsion of this solution using sodium lauryl sulfate or other suitable emulsifying agent, and add this emulsion to the latex prior to coagulation. When adding the stabilizer to the latex in any manner, it is highly desirable to maintain the mixture well agitated to insure satisfactory dispersion of the stabilizing agent. It should be understood that it is necessary to provide a thorough and uniform dispersion of the stabilizer throughout the resin, but that the method of incorporation is of less importance.

An olefin-sulfur dioxide resin was prepared using the following emulsion recipe in a stainless steel autoclave:

Ingredients: Parts by weight
Technical 1-butene [1] _____ 46.7
Sulfur dioxide _____(35 parts excess)__ 88.3
Water _____ 220
Ammonium nitrate _____ 0.5
Maprofix MM [2] _____ 1.0

[1] Technical 1-butene containing at least 95 mol percent 1-butene.
[2] Sodium lauryl sulfate dispersing agent commercially available in the form of a paste containing about 60 per cent solids.

The polymerization was carried out for a period of 4.8 hours at a temperature of 100° F. and a conversion of 96 per cent was obtained. At the end of the reaction period the reactor was opened and excess sulfur dioxide was vented. To effect coagulation of the resin, the latex was warmed to 110° F., 2 liters of 20 weight per cent sodium chloride solution and 3 liters of methyl alcohol were added, and the mixture was heated to 140° F. The resin particles were separated from the liquid, washed with water, and dried in the usual manner.

The resin prepared as above was tested for thermal stability in the following manner: Weighed portions of stabilized and unstabilized resin were placed in suitable test tubes, which were then partially immersed in a constant temperature bath, held at 375±2° F., for varying periods of time. The stabilized samples were prepared by dissolving the stabilizer in benzene and adding this solution to the dry, powdered resin. The thermal decomposition is measured by the per cent loss in weight of the resin determined at the end of the heating periods. (Benzene evaporated from resin before weighing out samples.)

Di-n-hexyl dithiophosphoric acid and di-n-dodecyl dithiophosphoric acid were tested as stabilizing agents in this olefin-SO₂ resin and the results are shown in the following tables:

| Wt. Percent Stabilizer (based on dry resin) Di-n-dodecyl dithiophosphoric acid $$C_{12}H_{25}O-\overset{\overset{S}{\|}}{\underset{OC_{12}H_{25}}{P}}-SH$$ | Percent Loss in Weight at End of X Hours Heating at 375±2° F. | | |
|---|---|---|---|
| | 0.5 | 1.0 | 3.0 |
| 0.25 | 1.9 | 4.0 | 13.0 |
| 0.50 | 2.0 | 4.1 | 12.3 |
| 1.0 | 1.5 | 3.2 | 10.3 |
| 2.0 | 1.4 | 2.6 | 9.0 |
| None (control) | 12.1 | 17.3 | 28.6 |

| Wt. Percent Stabilizer (based on dry resin) Di-n-hexyl dithiophosphoric acid $$C_6H_{13}O-\overset{\overset{S}{\|}}{\underset{OC_6H_{13}}{P}}-SH$$ | Percent Loss in Weight at End of X Hours Heating at 375±2° F. | | |
|---|---|---|---|
| | 0.5 | 1.0 | 3.0 |
| 0.25 | 1.6 | 3.6 | 13.8 |
| 0.50 | 1.5 | 3.2 | 14.4 |
| 1.0 | 1.3 | 2.7 | 13.3 |
| 2.0 | 1.5 | 2.9 | 12.9 |
| None | 13.1 | 18.0 | 29.2 |

Data on the stabilizing effect of trilauryl dithiophosphate and tetralauryl trithiopyrophosphate as stabilizers for polysulfone resins are presented below together with decomposition data on an unstabilized control. In each test, two weight per cent of the stabilizer based on dry resin was used. The stabilizer in each instance was dissolved in benzene and this solution added to the dry resin powder. The benzene was evaporated in each instance prior to weighing out samples for the decomposition tests.

| | Percent Loss in Weight at End of X Hours Heating at 375±2° F. | | |
|---|---|---|---|
| | 0.5 hr. | 1 hr. | 3 hrs. |
| Trilauryl Dithiophosphate * | 1.4 | 3.1 | 11.1 |
| Tetralauryl Trithiopyrophosphate ** | 1.2 | 2.4 | 10.3 |
| Control | 12.6 | 18.0 | 29.3 |

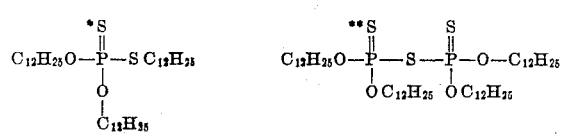

The resin used in the above tests was made from the following recipe:

| | Parts |
|---|---|
| Technical 1-butene | 46.7 |
| Sulfur dioxide | 88.3 |
| Water | 220.0 |
| Maprofix-MM | 1.5 |
| Ammonium nitrate | 0.5 |

Coagulation was effected by adding a portion of filter cake from an earlier run (same recipe). The system creamed at 120° F. and became thick at 130° F. Water was then added and the entire volume heated to 155° F. The resulting slurry contained the coarse resin particles. The particles of resin were separated from the slurry, washed, and dried.

The coagulation of a resin from the latex, by addition of resin particles to the latex, is disclosed and claimed in copending application by R. J. Fanning, Serial No. 264,833, filed January 3, 1952, issued October 26, 1954, as Patent 2,692,872.

The stabilizers used in the preceding examples were prepared according to the following methods:

Di-n-dodecyl dithiophosphoric acid was prepared by mixing 200 grams of n-dodecyl alcohol, 63.0 grams phosphorus pentasulfide (based on 95 per cent purity) and 1200 ml. benzene and refluxing for 26 hours. During the last 8 hours of this run nitrogen was bubbled through the reaction mixture to remove the last traces of hydrogen sulfide. Benzene was then removed by distillation. A portion of this product was used in the above stability tests.

Di-n-hexyl dithiophosphoric acid was prepared by mixing 81.6 grams of n-hexyl alcohol, 44.4 grams phosphorus pentasulfide and 800 ml. benzene and refluxing for 13 hours. During the last 5 hours of this run nitrogen was bubbled through the reaction mixture to remove the last traces of hydrogen sulfide. Benzene was then separated from the product by distillation. A portion of this product was used in the above stability tests.

Trilauryl dithiophosphate was prepared by mixing 200 grams of lauryl alcohol, 50.3 grams phosphorus pentasulfide (based on 95 per cent purity) and 1100 ml. benzene and refluxing for 30 hours. During the last three hours of this run nitrogen was bubbled through the reaction mixture to remove the last traces of hydrogen sulfide. Benzene was then removed by distillation. A yield of 255.5 grams of product was obtained. Some lauryl alcohol remained in the product.

Tetralauryl trithiopyrophosphate was prepared by refluxing 56.5 grams of dilauryl dithiophosphoric acid in 600 ml. of toluene. Refluxing was continued for a period of 7 hours. The solvent was then evaporated.

In Serial Number 275,471 filed March 7, 1952, by John E. Wicklatz and John F. Howe there are described and claimed the preparation of thermally stable heteropolymeric resins of an unsaturated organic compound and sulfur dioxide by incorporating therewith a metal salt of an ester of dithiophosphoric acid in an amount effective to impart stability to the compositions thus produced. The compositions are also claimed.

In Serial Number 275,472 also filed March 7, 1952, by John E. Wicklatz and John F. Howe there are described and claimed a method for stabilizing and molding a polysulfone resin, produced by polymerizing together an unsaturated organic compound containing aliphatic unsaturation and sulfur dioxide, which comprises incorporating with said resin an ester of one of tetrathiophosphoric acid and trithiophosphorus acid in an amount effective to impart stability to the compositions thus produced. The compositions are also claimed.

Variation and modification are possible within the scope of the foregoing disclosure and the appended claims to the invention, the essence of which is that certain thiophosphoric acids and derivatives of thiophosphoric acids have been incorporated into so-called olefin sulfur dioxide resins, as described, and that the said compositions have been found to be stable in respect of thermal and extrusion decomposition.

I claim:

1. A method of molding thermally stable heteropolymeric resin, formed by the interaction of sulfur dioxide and an unsaturated organic material, in which the unsaturation is between two adjacent carbon atoms and which will polymerize with sulfur dioxide to form said resin, which comprises admixing with said resin at least one of the stabilizing agents selected from the group consisting of thiophosphoric acids and derivatives of thiophosphoric acids having the formulas (1) 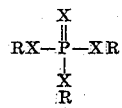

wherein X is selected from the group consisting of oxygen and sulfur, at least one and not more than three X's are sulfur, wherein R is selected from the group consisting of an alkyl group containing 1 to 16 carbon atoms, monovalent aromatic hydrocarbon groups containing from 6 to 16 carbon atoms and monovalent cycloalkyl hydrocarbon groups containing not more than 16 carbon atoms and hydrogen, and wherein when hydrogen is present, only R is hydrogen (2) 

(3) 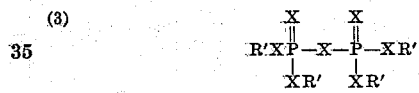

wherein X is selected from the group consisting of oxygen and sulfur and wherein at least three X's are sulfur;

(4) 

wherein X is selected from the group consisting of oxygen and sulfur and wherein at least one X is sulfur;

(5) 

wherein X is selected from the group consisting of oxygen and sulfur;

(6) 

wherein X is selected from the group consisting of oxygen and sulfur and wherein in formulas 2 to 6 R' is selected from the group consisting of monovalent alkyl hydrocarbon groups, monovalent aromatic hydrocarbon groups, monovalent cycloalkyl hydrocarbon groups, and wherein R' contains no more than 16 carbon atoms at each occurrence, Me is a metal selected from groups I-A, II-A, II-B, IV-B of the Mendeleeff's Periodic Table and $n$ is equal to the valence of said metal, in an amount effective to impart stability to the composition, and then heat molding the composition thus produced.

2. A method according to claim 1 wherein the resin is a 1-butene sulfur dioxide resin.

3. A method according to claim 1 wherein the amount of the stabilizer incorporated is 0.05 to 10 per cent by weight of the dry resin.

4. A method according to claim 1 wherein the stabilizer is added to the dry resin.

5. A method according to claim 1 wherein the stabilizer is added to a latex containing said resin.

6. A method according to claim 1 wherein the stabilizer is added to a latex containing said resin after coagulation of resin therein.

7. A method according to claim 1 wherein the resin is produced from 1-butene and sulfur dioxide by emulsion polymerization.

8. A stable heteropolymeric resin of an unsaturated organic compound and sulfur dioxide containing in an amount effective to impart stability to the composition thus produced at least one of a thiophosphoric acid and a derivative of a thiophosphoric acid having the formulas (1) 

wherein X is selected from the group consisting of oxygen and sulfur, at least one and not more than three X's are sulfur, wherein R is selected from the group consisting of an alkyl group containing 1 to 16 carbon atoms, monovalent aromatic hydrocarbon groups containing from 6 to 16 carbon atoms and monovalent cycloalkyl hydrocarbon groups containing not more than 16 carbon atoms and hydrogen, and wherein one R is hydrogen;

(2) 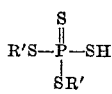

(3) 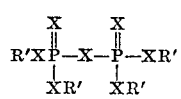

wherein X is selected from the group consisting of oxygen and sulfur and wherein at least three X's are sulfur;

(4) 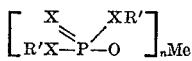

wherein X is selected from the group consisting of oxygen and sulfur and wherein at least one X is sulfur;

(5) 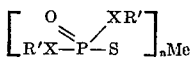

wherein X is selected from the group consisting of oxygen and sulfur;

(6) 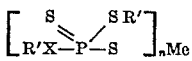

wherein X is selected from the group consisting of oxygen and sulfur and wherein in Formulas 2 to 6 R' is selected from the group consisting of monovalent alkyl hydrocarbon groups, monovalent aromatic hydrocarbon groups, monovalent cycloakyl hydrocarbon groups, and wherein R' contains no more than 16 carbon atoms at each occurrence, Me is a metal selected from groups I—A, IIA, II—B, IV—B of the Mendeleeff Periodic Table and $n$ is equal to the valence of said metal.

9. A composition according to claim 8 wherein the resin is a 1-butene sulfur dioxide resin.

10. A composition according to claim 8 wherein the amount of the stabilizer incorporated is 0.05 to 10 per cent by weight of the dry resin.

11. A thermally stable resin composition comprising a 1-butene sulfur dioxide resin and as a stabilizer therefor di-n-dodecyl dithiophosphoric acid in an amount sufficient to impart thermal stability to the composition.

12. A thermally stable resin composition comprising a 1-butene sulfur dioxide resin and as a stabilizer therefor di-n-hexyl dithiophosphoric acid in an amount sufficient to impart thermal stability to the composition.

13. A thermally stable resin composition comprising a 1-butene sulfur dioxide resin and as a stabilizer therefor trilauryl dithiophosphate in an amount sufficient to impart thermal stability to the composition.

14. A thermally stable resin composition comprising a 1-butene sulfur dioxide resin and as a stabilizer therefor tetralauryl trithiopyrophosphate in an amount sufficient to impart thermal stability to the composition.

15. A method according to claim 1 wherein the stabilizer is di-n-dodecyl dithiophosphoric acid.

16. A method according to claim 1 wherein the stabilizer is di-n-hexyl dithiophosphoric acid.

17. A composition according to claim 8 wherein the stabilizer is di-n-dodecyl dithiophosphoric acid.

18. A composition according to claim 8 wherein the stabilizer is di-n-hexyl dithiophosphoric acid.

No references cited.